G. N. OSGOOD.

Steam Bell-Ringer.

No. 8,813. Reissued July 15, 1879.

Witnesses.

H. S. Bellows

Chas. E. Foltard

Inventor.

G. N. Osgood

Per Brown Bros

Attorneys.

N. PETERS, PHOTO-LITHOGRAPHER, WASHINGTON, D. C.

UNITED STATES PATENT OFFICE.

GALEN N. OSGOOD, OF BOSTON, MASSACHUSETTS.

IMPROVEMENT IN STEAM BELL-RINGERS.

Specification forming part of Letters Patent No. 203,760, dated May 14, 1878; Reissue No. 8,813, dated July 15, 1879; application filed June 9, 1879.

*To all whom it may concern:*

Be it known that I, GALEN N. OSGOOD, of Boston, in the county of Suffolk and State of Massachusetts, have invented certain new and useful Improvements in Steam Bell-Ringers, of which the following is a full, clear, and exact description.

This invention relates to steam bell-ringers, more particularly designed for locomotives, although, as will be obvious from the description hereinafter given, it is adapted to the ringing of bells by means of steam in connection with other purposes.

This improved steam bell-ringer consists of mechanism attached to and connected with the shaft or trunnions of the bell in a manner for the steam to act directly on said shaft; and it also consists, in substance, of a circular steam-cylinder, which has within its chamber a head adapted to move about its axis as a center, and a stationary radial partition, with the head dividing the said chamber into two parts or divisions, and which also has steam inlet and outlet ports adapted, through suitable mechanism arranged in connection with them, to be opened and closed in such relative manner that steam can pass to the said steam-chamber, to move the said head first in the one direction, and then the steam escape to allow the head to be returned or to return to its normal position, and similarly then in the other and reverse direction, and so on as long as the steam may be in communication, whereby, through a suitable mechanism connecting the said head with the bell which it is desired to ring—as, for instance, the attachment of the said head directly to a shaft which extends axially through the said chamber, and is suitably steam-packed at its bearings or supports—the bell will be rung by the steam, all substantially as hereinafter described.

Figure 1:
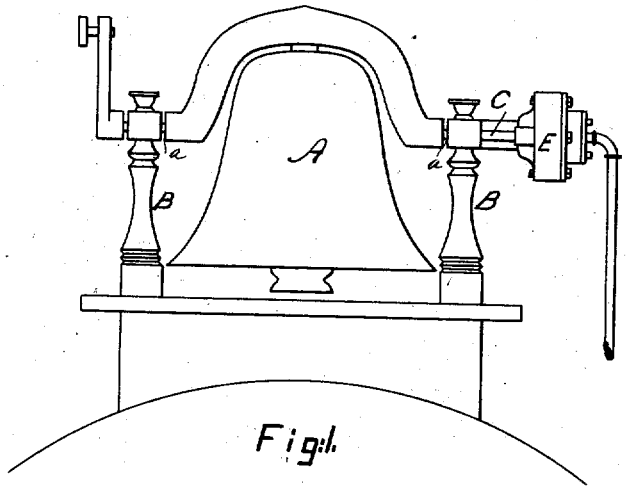
Figure 2:
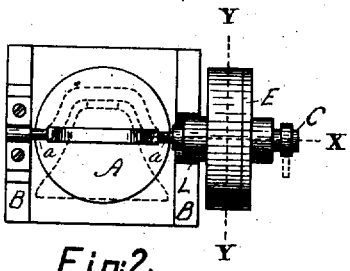
Figure 3:
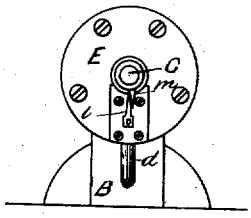
Figure 4:
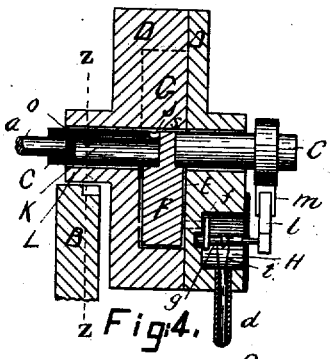
Figure 5:
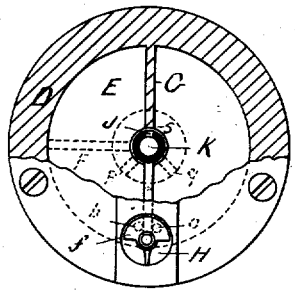
Figure 6:
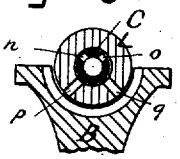
Figure 7:
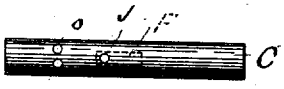

In the accompanying plate of drawings an arrangement of mechanism such as is embraced by this invention for a steam bell-ringer is illustrated, Figure 1 being a view in side elevation; Fig. 2, a plan view. Fig. 3 is an end view of the steam-cylinder; Fig. 4, a central vertical section on line *x x*, Fig. 2; Fig. 5, a face view, in part, of the interior of the steam-cylinder and of the valve-chamber, from which lead the steam-inlet ports; Fig. 6, a detail section on line *z z*, Fig. 4; Fig. 7, a view in detail, to be hereinafter referred to.

In the drawings, A represents a bell, supported and turning by trunnions *a a* upon supports B B; C, a shaft, which is an extension of one of the trunnions *a a*, and passes centrally through the parallel heads or ends D D of a circular steam-chamber, E, secured in an upright position. This shaft is suitably steam-packed, and within the steam-chamber E it carries a radial head or ring, F, which closely fits the peripheral and end wall of the chamber, and diametrical with which, when it is in its lowest and vertical position, is a stationary partition, G, of the chamber, closely fitting the outline of the shaft at its end toward the shaft; *b c*, two ports leading from a supplementary chamber, H, connected with the steam-supply *d* to the cylindrical steam-chamber E at its lowest part, which ports, when the head F is at rest and pending, are one upon each side thereof. These ports *b c* are the inlet-ports of the steam, and covering them within the chamber is a semicircular disk, *f*, attached to a horizontal shaft, *g*, which turns in suitable bearings of the end walls of said chamber H, and on its projecting end *h* carries a radial dog or arm, *l*, in position for the radial dog or arm *m* of the cylinder-shaft C to abut against.

J is a port in cylinder-shaft C, and opening from the steam-cylinder chamber E into a chamber, K, of such shaft, from which chamber open two radial ports, *n o*, in line with each of which are ports *p q* in and through the bearings L of the shaft C, but on the opposite side to the ports *n o*.

The port J is the steam-outlet port from the steam-cylinder chamber E, and when either of the shaft-ports *n o* are in line with either of the bearing-ports *p q*, communication obviously is made with the interior of the steam-cylinder for the escape of steam therefrom, provided the shaft-port J is turned from its position under the stationary head G.

The several parts and steam-ports above described, when the bell is in a state of rest, are arranged in relation to each other for the head to hang vertically between the two steam-inlet ports *b c*, the valve-plate to cover said ports, and the steam-outlet port J to be in line with and closed by the end S of the partition G against the shaft, the escape-ports of the shaft C and the shaft-bearing L to be out of communication with each other, and the dogs of the valve and cylinder-shaft C to be in contact with each other.

With them thus arranged, by simply turning the cylinder-shaft C in a direction for its dog to abut against and push the dog of the valve-shaft, the valve-shaft is turned, which opens one of the steam-inlet ports to the passage of steam to the cylinder-chamber E, where it acts on the head F, and continues to turn the cylinder-shaft in the same direction until, by the alignment of one of the ports *n o* of the shaft C with a port, *p* or *q*, of the shaft-bearing, the steam is given an escape from the cylinder, which relieves its pressure and allows the weight of the bell A to overcome it and to reverse the movement of the cylinder-shaft, which returns the shaft C to and beyond its normal position, closing both inlet-ports in such return; but as its head is thus carried by its center the other inlet-port is opened, through which steam then passes to the opposite side of the head, and thus the shaft is continued in its said movements until, under such movement, the steam is given an escape from the cylinder, as before described, through the ports of the cylinder-shaft C and the shaft-bearing, but in this case through the other pair of such ports, which allows the weight of the bell to overcome the steam-pressure, and the movement of the shaft is again reversed in direction until the first inlet-port is again opened, when the movement of head first described is repeated, and so on from time to time until either the bell is held from moving beyond its vertical pendent line or the steam shut off.

In the above-described movement of the valve-shaft the action of the spring *t*, after the dog of the cylinder-shaft leaves its dog, throws the shaft and its dog again to their normal positions.

In lieu of connecting the mechanism herein described for the steam to act upon directly with the bell-trunnions, the connection may be made through a train of gearing or other suitable mechanism.

Again, obviously, other forms of steam-valves may be used, and in lieu of depending upon the weight of the bell to return the head to and beyond its normal position, the steam may be obviously employed for such purpose.

Having thus described my invention, what I claim, and desire to secure by Letters Patent, is—

1. The shaft or piston-rod of the motor directly coupled or connected to the shaft or yoke of the bell without any intervening mechanism, substantially as and for the purpose set forth.

2. A circular steam-cylinder having within it a movable head or piston, the shaft or pivot of which is directly connected to the shaft or yoke of a bell, substantially as described.

3. In combination with a locomotive or other bell, A, the steam-cylinder E, provided with a partition, G, and moving head F, attached to a shaft, C, and with steam inlet and outlet ports *b c J n o*, all arranged together substantially as described, and for the purpose specified.

GALEN N. OSGOOD.

Witnesses:
EDWIN W. BROWN,
W. S. BELLOWS.